United States Patent
Feder et al.

(10) Patent No.: US 8,927,627 B2
(45) Date of Patent: Jan. 6, 2015

(54) SILICONE COMPOSITION FOR COATING A FLEXIBLE SUPPORT INTENDED TO FORM A CROSSLINKED COATING HAVING INCREASED ATTACHMENT, MECHANICAL STRENGTH AND REACTIVITY

(75) Inventors: Michel Feder, Villeurbanne (FR); Yassine Maadadi, Decines (FR)

(73) Assignee: Bluestar Silicones France SAS, Lyons (FR)

( * ) Notice: Subject to any disclaimer, the term of this patent is extended or adjusted under 35 U.S.C. 154(b) by 145 days.

(21) Appl. No.: 13/056,173

(22) PCT Filed: Jul. 29, 2009

(86) PCT No.: PCT/EP2009/059827
§ 371 (c)(1),
(2), (4) Date: Mar. 30, 2011

(87) PCT Pub. No.: WO2010/012787
PCT Pub. Date: Feb. 4, 2010

(65) Prior Publication Data
US 2011/0183566 A1     Jul. 28, 2011

(30) Foreign Application Priority Data

Jul. 30, 2008 (FR) ...................................... 08 55257

(51) Int. Cl.
| | | |
|---|---|---|
| *C08K 9/00* | (2006.01) |
| *C08K 9/06* | (2006.01) |
| *B32B 27/02* | (2006.01) |
| *B32B 9/04* | (2006.01) |
| *D06M 11/79* | (2006.01) |
| *C08L 83/04* | (2006.01) |
| *C09D 183/04* | (2006.01) |
| *D06M 15/643* | (2006.01) |
| *C08G 77/16* | (2006.01) |

(52) U.S. Cl.
CPC ................ *D06M 11/79* (2013.01); *C08L 83/04* (2013.01); *C09D 183/04* (2013.01); *D06M 15/643* (2013.01); *C08G 77/16* (2013.01)
USPC ........... 523/213; 523/212; 523/216; 442/164; 428/447

(58) Field of Classification Search
None
See application file for complete search history.

(56) References Cited

U.S. PATENT DOCUMENTS

| | | | |
|---|---|---|---|
| 5,087,684 A | 2/1992 | Perrin | |
| 6,425,600 B1 | 7/2002 | Fujiki et al. | |
| 6,902,816 B1 * | 6/2005 | Bertry et al. | 428/447 |
| 2002/0058112 A1 | 5/2002 | Branlard et al. | |
| 2004/0044113 A1 * | 3/2004 | Jackson et al. | 524/492 |
| 2006/0111464 A1 * | 5/2006 | Bissinger et al. | 523/115 |

FOREIGN PATENT DOCUMENTS

| | | |
|---|---|---|
| EP | 1078823 B1 | 11/2002 |
| EP | 1867401 A1 | 12/2007 |
| EP | 1688463 B1 | 7/2008 |

OTHER PUBLICATIONS

English Translation of International Search Report dated Jan. 14, 2010 of PCT/EP2009/059827, filed Jul. 29, 2009.

* cited by examiner

*Primary Examiner* — Jennifer Chriss
*Assistant Examiner* — Camie Thompson
(74) *Attorney, Agent, or Firm* — Pearne & Gordon LLP

(57) ABSTRACT

Crosslinkable or crosslinked silicone compositions, forming water-repellent and release coating for a flexible heat sensitive support of paper or polymer, and comprising crosslinking polyorganosiloxanes (POSs) bearing ≡Si—H units and unsaturated, preferably ≡Si-Vi, vinyl-containing POSs, capable of reacting with the crosslinker by polyaddition, in the presence of platinum in order to form the crosslinked release coating on the flexible support. The object is enabling the coating composition to crosslink instantaneously to produce, on various flexible supports (paper, e.g. glassine, or polymer, e.g. polyester such as polyethylene terephthalate PET), a crosslinked silicone coating leaving the coating machine, with excellent attachment (adhesion) and mechanical strength or cohesion—"Rub-off"—properties. The invention uses, per 100 parts by weight of silicone base, of 1 to 40 parts by weight of an additive comprising from 1 or 5 to 80% by weight of particulate filler, preferably nanoscale filler, in a silicone oil reacting with the crosslinker.

13 Claims, No Drawings

SILICONE COMPOSITION FOR COATING A FLEXIBLE SUPPORT INTENDED TO FORM A CROSSLINKED COATING HAVING INCREASED ATTACHMENT, MECHANICAL STRENGTH AND REACTIVITY

FIELD OF THE INVENTION

The field of the invention is that of crosslinkable or crosslinked silicone compositions capable of being used in particular to form a water-repellent and release coating or film on a fibrous or nonfibrous support, for example made of paper or the like, or alternatively made of natural or synthetic polymer.

More specifically, the invention relates to silicone compositions of the type of those comprising:
- functionalized polyorganosiloxanes (POSs) carrying, on or not on the same molecule, Si—H and Si-EU units, with EU representing a group comprising at least one ethylenic, preferably vinyl, unsaturation; the Si—H units being capable of reacting with the Si-EU units by polyaddition;
- and/or POSs which can crosslink by the cationic and/or radical route, via crosslinking functional groups CFGs comprising at least one ethylenically unsaturated, advantageously acrylate and/or alkenyl ether, and/or epoxide and/or oxetane functional group;
- an appropriate metal catalyst, preferably a platinum catalyst, as regards the crosslinking by polyaddition, and preferably a cationic initiator comprising as thermal initiator and/or photoinitiator, preferably chosen from onium salts, as regards the crosslinking;
- optionally at least one adhesion-adjusting system, for example based on a silicone resin comprising Q ($SiO_{4/2}$) and/or T ($RSiO_{3/2}$) units;
- optionally other additives (fillers, accelerators, inhibitors, pigments, surfactants, and the like).

The invention also relates to:
- the preparation of this silicone composition;
- the supports coated with a coating which is obtained from this silicone composition;
- the manufacture of articles made of crosslinked silicone, in particular coatings, e.g. water-repellent and/or release coatings, for fibrous or nonfibrous flexible supports (paper or polymer film), from this composition targeted above;
- a process for jointly increasing the attachment on departing from the coating machine, the mechanical strength and the reactivity of a release and water-repellent silicone coating coated onto a fibrous or nonfibrous flexible support capable of being obtained by crosslinking this silicone composition.

For example, these liquid silicone compositions (with/without solvent or as an aqueous emulsion) are applied to the support films in industrial coating devices comprising rolls operating at a very high speed (for example 600 m/min).

The liquid silicone coating compositions of more particular interest in the context of the invention are solvent-free.

In practice, the degree of deposition of release silicone is between 0.1 and 2 $g/m^2$, preferably between 0.3 and 1 $g/m^2$, which corresponds to thicknesses of the order of a micrometer.

Once applied to the flexible support, the silicone composition crosslinks to form a firm release and/or water-repellent coating made of silicone (e.g. elastomer).

In the case of solvent-free liquid silicone systems which crosslink by polyaddition [Si—H/Si-alkenyl-(Vi)-], the crosslinking is carried out under thermal activation.

The crosslinking of the compositions which can crosslink by polyaddition can be carried out with thermal activation.

The crosslinking of the compositions which can crosslink by the cationic and/or radical route can be carried out with activation by exposure to a beam of electrons and/or to actinic radiation of UV type and/or with thermal activation.

The flexible supports coated with a release silicone film can be, for example:
- an adhesive tape, the inner face of which is coated with a layer of pressure-sensitive adhesive and the outer face of which comprises the release silicone coating;
- or a paper (for example glassine) or a polymer film for protecting the adhesive face of a self-adhesive element or pressure-sensitive adhesive;
- or a polymer film of the Poly(Vinyl Chloride) (PVC), PolyPropylene, Polyethylene or Poly(Ethylene Terephthalate) type.

These supports can in particular be supports for self-adhesive labels (liners composed of silicone-treated papers or polymer films).

TECHNICAL PROBLEMS AND PRIOR ART

For all these supports coated industrially with crosslinked release silicone coatings, the constant concern of the manufacturers is to jointly increase the attachment on departing from the coating machine, the mechanical strength and the reactivity of the silicone coating.

The attachment or the adhesion of the coating to the support on departing from the coating machine, that is to say in the thirty minutes which follow the coating and the crosslinking, and the mechanical strength or cohesion of the coating can be assessed, for example, by the rub-off trade test, which consists in rubbing the surface of the coating with a finger and in measuring the number of successive passes which result in damage to the coating. The mechanical strength is sometimes expressed through the resistance to abrasion.

As regards the reactivity, in view of the very high-speed industrial coating rates, the kinetics of crosslinking have to be instantaneous and the crosslinking has to be correct, that is to say that the release silicone films have to be sufficiently crosslinked to be able to fulfill as best as possible their release role and to possess the desirable mechanical qualities. The assessment of the quality of the crosslinking of the release silicone film can occur in particular through the quantitative determination of the uncrosslinked extractable compounds, the amount of which must be as small as possible.

In practice, it is very difficult to jointly improve the attachment, the mechanical strength and the reactivity.

The objective targeted above is even more ambitious if all or some of the following constraints are added thereto:
- to reduce the concentrations of catalyst, in particular when platinum is involved, which, due to its cost, is a predominant element in the cost price of a polyaddition system, in this release and/or water-repellent silicone coating application for flexible supports (paper or polymer film), it being known that, if the level of platinum is reduced to a level of less than 100 ppm, indeed even than 80 ppm, in the composition, it is then no longer possible to obtain completely crosslinked release and/or water-repellent silicone coatings;
- to reduce the crosslinking temperature for economic reasons;

to increase the rate of forward progression of the support to be coated;

to obtain a good ability to release of the free outer face of the silicone coating, that is to say a weak and controlled detachment force for the element intended to be positioned on the support coated with the release silicone film (e.g., adhesive face of a label or of a tape of the same kind);

to lengthen the lifetime at ambient temperature of the crosslinkable silicone coating compositions when they are in the form of a coating bath in industrial coating devices.

Several trails have been explored in attempting to overcome these difficulties: to modify the nature of the crosslinking POSs comprising Si—H units and/or of the POSs comprising Si-EU units or alternatively to incorporate various additives.

As regards the nature of the crosslinking POSs, the use of crosslinking agents of the type of those comprising siloxy units: dimethylhydrosiloxy (M'), methylhydrosiloxy (D'), dimethylsiloxy (D) and trimethylsiloxy (M) units, for liquid silicone compositions which can crosslink by polyaddition (≡Si—H/Si-Vinyl), in order to form release coatings on flexible supports (coated or uncoated paper, polymer films, and the like) has already been generally disclosed.

This is thus the case in patent application EP-A-0 523 660, which describes silicone compositions which can crosslink in a few seconds at temperatures below 100° C. and which comprise network (nonlinear) ≡Si-Vi POS resins and ≡Si—H POS crosslinking agents of $M(D')_e(D)_eM$, $M(D')_eM$, $M(D')_e(D)_eM'$ or $M(D')_eM'$ type with "e" corresponding to integers which are identical to or different from one another, these crosslinking agents being employed alone or as a mixture.

Crosslinking systems of this type make it possible to obtain a good reactivity (often with a low catalyst content) but generally exhibit the disadvantage of the achievement of coatings having markedly inadequate properties of adhesion and of resistance to abrasion.

Application WO-A-04/054059 describes specific ≡Si—H POS crosslinking agents which confer, on the crosslinked coating, advantageous properties in terms of reduced level of extractables and of duration of stability of the bath of liquid silicone coating composition, in particular. These specific Si—H POS crosslinking agents are composed of POSs hydrogenated at the chain end and in the chain: $0<D/D'\leq0.4$ and $20\leq M'/D'\times1000\leq60$, such as: $M_{1.2}D_6D'_{30}M'_{0.8}$ or $M_{0.8}D_4D'_{25}W_{1.2}$.

Furthermore, the increasingly high linear rates of forward progression of the strip of flexible supports on continuous coating devices results in a problem of the appearance of a mist or aerosol (misting, fogging) in the surroundings of the coating head. This mist has the following negative consequences: loss of consumable, appearance, mechanical qualities (rub-off), ability to release of the crosslinked coating, industrial hygiene and safety of the operators, rapid fouling of the roll coating device, resulting in maintenance constraints and premature wear.

One of the known possibilities for combating this problem of misting is to use a liquid silicone coating composition comprising a silicone phase with a viscosity at 25° C. of less than 2000 mPa·s comprising POSs which can crosslink by polyaddition, crosslinking POSs, a catalyst and an antimisting agent based on noncellulose particles in a silicone phase. This liquid silicone coating composition is described in patent application WO-A-02/18506.

In this context, the present invention is targeted at meeting in particular at least one of the following objectives:

a. Providing a novel liquid silicone coating composition which can crosslink to give a release and/or water-repellent coating on a flexible support, under thermal and/or actinic activation and/or activation by a beam of electrons, instantaneously, to produce, on all types of flexible supports (paper, e.g. glassine, or polymer, e.g. polyester, such as Poly(Ethylene Terephthalate) PET), a crosslinked silicone coating having, in particular on departing from the coating device, that is to say in the thirty minutes which follow the coating and the crosslinking, excellent properties of attachment (adhesion) and of mechanical strength or cohesion, rub-off.

b. Providing a novel liquid silicone coating composition which can crosslink to give a release and/or water-repellent coating on a flexible support, under thermal and/or actinic activation and/or activation by a beam of electrons, instantaneously, to produce, on all types of flexible supports (paper, e.g. glassine, or polymer, e.g. polyester, such as Poly(Ethylene Terephthalate) PET), a crosslinked coating of use in particular as support for self-adhesive labels (liners composed of silicone-treated papers or films) and exhibiting an improved reactivity/cohesion compromise, the reactivity being characterized by reduced levels of extractables and the cohesion by the rub-off, in particular at the device outlet.

c. Providing a novel liquid silicone coating composition which can crosslink to give a release and/or water-repellent coating on a flexible support, under thermal and/or actinic activation and/or under activation by a beam of electrons, on high-speed coating devices, this silicone composition having a low content of catalyst (for example of platinum).

d. Providing a novel liquid silicone coating composition which can crosslink to give a release and/or water-repellent coating on a flexible support, under thermal and/or actinic activation and/or under activation by a beam of electrons, on high-speed coating devices, this silicone composition making it possible to reduce the crosslinking temperature for reasons of economy.

e. Providing a novel liquid silicone coating composition which can crosslink to give a release and/or water-repellent coating on a flexible support, under thermal and/or actinic activation and/or under activation by a beam of electrons, on high-speed coating devices, this silicone composition making it possible to increase the rate of forward progression of the support to be coated.

f. Providing a novel liquid silicone coating composition which can crosslink to give a release and/or water-repellent coating on a flexible support, under thermal and/or actinic activation and/or under activation by a beam of electrons, on high-speed coating devices, this silicone composition making it possible to obtain a good ability to release of the free outer face of the silicone coating, that is to say a weak and controlled detachment force for the element intended to be positioned on the support coated with the release silicone film (e.g., adhesive face of a label or of a tape of the same type).

g. Providing a novel liquid silicone coating composition which can crosslink to give a release and/or water-repellent coating on a flexible support, under thermal and/or actinic activation and/or under activation by a beam of electrons, on high-speed coating devices, this silicone composition making it possible to lengthen the lifetime at ambient temperature of the crosslinkable silicone coating compositions when they are in the form of a coating bath in industrial coating devices.

h. Providing a novel liquid silicone coating composition which can crosslink to give a release and/or water-repellent coating on a flexible support, under thermal and/or actinic activation and/or under activation by a beam of electrons, on high-speed coating devices, this silicone composition in addition being easy to prepare and economical.

i. Providing a novel use of a silicone slurry (concentrated suspension) comprising from 10 to 50% by weight, preferably from 10 to 45% by weight, of particulate filler in a silicone oil, preferably a reactive silicone oil, in order to jointly increase the attachment on departing from the coating device, the mechanical strength and the reactivity of a release and water-repellent silicone coating coated onto a fibrous or nonfibrous flexible support capable of being obtained by high-speed crosslinking of a liquid silicone coating composition.

j. Providing a novel process for jointly increasing the attachment on departing from the coating device, the mechanical strength and the reactivity of a release and water-repellent silicone coating coated onto a fibrous or nonfibrous flexible support capable of being obtained by high-speed crosslinking of a liquid silicone coating composition.

k. Providing a novel support coated with a coating obtained from the liquid silicone coating composition targeted in objectives a to h.

l. Providing a novel process for the production of crosslinked release and/or water-repellent silicone coatings on flexible supports starting from the liquid silicone coating composition targeted in objectives a to h.

BRIEF DESCRIPTION OF THE INVENTION

These objectives, among others, are achieved by the present invention, which relates first to a novel liquid silicone composition for high-speed coating onto fibrous or nonfibrous flexible supports and which is capable of crosslinking to form a release and water-repellent coating, comprising a silicone base capable of curing by radical or cationic polyaddition reactions comprising, per 100 parts by weight of base, from 1 to 40 parts by weight, preferably from 1 to 30 parts by weight, preferably from 3 to 20 parts by weight, of an additive essentially composed:

I. of from 1 to 80% by weight, or from 5 to 80% by weight, or also from 10 to 50% by weight, preferably from 10 to 45% by weight, of particulate siliceous filler, preferably of nanometric size, treated with at least one compatibilizing agent, II. of from 95 to 20% by weight, preferably from 90 to 55% by weight, of at least one silicone oil having a viscosity $\eta II$, in mPa·s at 25° C., such that, in increasing order of preference:
$8000 \leq \eta II \leq 2\,000\,000$
$8000 \leq \eta II \leq 500\,000$
$8000 \leq \eta II \leq 100\,000$ III. and optionally of at least one silicone oil with a viscosity of less than or equal to 8000 mPa·s at 25° C.;

the particulate siliceous filler being dispersed in the silicone oil II, optionally made up with the silicone oil III;

this composition having an overall viscosity of less than or equal to 5000 mPa·s at 25° C., preferably of less than or equal to 2000 mPa·s at 25° C.

The composition according to the invention makes it possible to spectacularly improve (in particular) on departing from the coating device, that is to say, for example, in the thirty minutes which follow the coating and the crosslinking, the attachment/cohesion/reactivity compromise by incorporation of an optimum dose of a specific silicone additive comprising inorganic (nano)fillers (for example, pyrogenic silica) treated in situ with HMDZ (hexamethyldisilazane) and/or VMN (DiVinyltetramethyldisilazane) dispersed in a silicone oil (for example comprising Si-EU, e.g. vinyl, units) which is viscous (viscosity for example greater than 1000 mPa·s at 25° C.).

This silicone composition based on silicone oils preferably crosslinking by polyaddition, by the cationic or radical route, sets very rapidly and is capable of forming a release coating having a high mechanical strength on paper (for example glassine or craft paper) or on a film, in particular made of polyester or polyethylene. The coating obtained is particularly adherent and strong on the support. It makes it possible to contribute the property of ability to release with regard to adhesives of Pressure-Sensitive Adhesives (PSAS) types and exhibits an excellent mechanical strength even after accelerated aging of the support (high relative temperatures and humidity) and on prolonged contact with these adhesives, including acrylic adhesives.

Secondly, the invention relates to a support coated with a coating obtained from the composition according to the invention, characterized in that it is chosen from flexible supports made of paper, board or the like, flexible woven or nonwoven fibrous supports, flexible supports comprising polyethylene and/or polypropylene and/or polyester (e.g., PET) and/or poly(vinyl chloride), and/or thermally printable flexible supports.

Thirdly, the invention relates to the use of a silicone additive (concentrated suspension) comprising from 1 or 5 to 80% by weight, or also from 10 to 50% by weight, and preferably from 10 to 45% by weight, of particulate filler in a silicone oil, preferably a reactive silicone oil, in order to jointly increase the attachment on departing from the coating device, the mechanical strength and the reactivity of a release and water-repellent silicone coating coated onto a fibrous or nonfibrous flexible support capable of being obtained by crosslinking by radical or cationic polyaddition reactions of a liquid silicone composition for high-speed coating. Preferably, the liquid silicone composition for high-speed coating is as defined above.

Fourthly, the invention relates to a process for the production of crosslinked release and/or water-repellent silicone coatings on flexible supports, characterized in that it consists essentially in employing the liquid silicone coating composition according to the invention in a high-speed industrial coating device.

Fifthly, the invention relates to a process for jointly increasing the attachment on departing from the coating device, the mechanical strength and the reactivity of a release and water-repellent silicone coating coated onto a fibrous or nonfibrous flexible support, in which a liquid silicone composition for high-speed coating is crosslinked, said liquid silicone composition comprising a silicone base capable of curing by radical or cationic polyaddition reactions comprising, per 100 parts by weight of base, from 1 to 40 parts by weight, preferably from 1 to 30 parts by weight, preferably from 3 to 20 parts by weight, of an additive essentially composed:

I. of from 1 to 80% by weight, or from 5 to 80% by weight, or also from 10 to 50% by weight, preferably from 10 to 45% by weight, of particulate siliceous filler, preferably of nanometric size, treated with at least one compatibilizing agent, II. of from 95 to 20% by weight, preferably from 90 to 55% by weight, of at least one silicone oil having a viscosity $\eta II$, in mPa·s at 25° C., such that, in increasing order of preference:
8000≤ηII≤2 000 000
8000≤ηII≤500 000
8000≤ηII≤100 000
III. and optionally of at least one silicone oil with a viscosity ηIII of less than or equal to 8000 mPa·s at 25° C.;
the particulate siliceous filler being dispersed in the silicone oil II, optionally made up with the silicone oil III;
and said composition having an overall viscosity of less than or equal to 5000 mPa·s at 25° C., preferably of less than or equal to 2000 mPa·s at 25° C.

DEFINITIONS

The specific additive (I), (II) (and optionally III) of the composition according to the invention can be also denoted without distinction by the term "slurry" or "dispersion".

All the viscosities concerned within the present account correspond to a dynamic viscosity quantity at 25° C. referred to as "Newtonian", that is to say the dynamic viscosity which is measured, in a way known per se, at a shear rate gradient which is sufficiently low for the viscosity measured to be independent of the rate gradient. This viscosity can be measured, for example, using a Brookfield viscometer according to the standard AFNOR NFT 76 102 of February 1972.

The expression "on departing from the coating device" means, within the meaning of the present account, for example within the thirty minutes which follow the coating and the crosslinking by thermal activation (e.g., in the oven or, for example, under the IR lamps) and/or by actinic activation (e.g., UV lamps) and/or by activation using a beam of electrons.

As regards the "silicones" terminology used in the present account:
a "D" siloxyl unit denotes $(R_2)SiO_{2/2}$
a "D'" siloxyl unit denotes $RHSiO_{2/2}$
a "$D^{Vi}$" siloxyl unit denotes $R(Vinyl)SiO_{2/2}$
a "T" siloxyl unit denotes $RSiO_{3/2}$
a "Q" siloxyl unit denotes $SiO_{4/2}$ In these formulae, the R groups represent monovalent groups which are identical to or different from one another, each R group preferably being a group of:
an alkyl radical which has from 1 to 5 carbon atoms and which can comprise from 1 to 6 chlorine atoms,
cycloalkyl radicals which have from 3 to 8 carbon atoms and which can comprise from 1 to 4 chlorine atoms,
aryl or alkylaryl radicals which have from 6 to 8 carbon atoms and which can comprise from 1 to 4 chlorine atoms,
cyanoalkyl radicals which have from 3 to 4 carbon atoms;
these radicals optionally being substituted in particular by halogens and/or alkoxyls; methyl, ethyl, propyl, isopropyl, butyl, isobutyl, n-pentyl, t-butyl, chloromethyl, dichloromethyl, α-chloroethyl, α,β-dichloroethyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, or xylyl, such as 2,3-dimethylphenyl or 3,4-dimethylphenyl, groups being preferred; the methyl and phenyl radicals being particularly preferred.

The term "high-speed coating" denotes, for example, speeds of greater than or equal to 100 m/min, preferably 300 m/min, e.g. between 500 and 1000 m/min.

DETAILED DESCRIPTION OF THE INVENTION

The Composition

Advantageously, this composition is:
of the type of those which can crosslink by a polyaddition mechanism involving Si—H and Si-EU units with EU representing a group comprising at least one ethylenic, preferably vinylic, unsaturation, the Si-EU units belonging to at least one polyorganosiloxane A (POS-A) carrying, per molecule, at least two Si-EU units, POS-A, whether singular or plural, constituting a polymer base PB capable of reacting with a crosslinking agent R in which the Si—H units belong to at least one polyorganosiloxane B (POS-B), in the presence of a metal catalyst D,
or of the type of those which can crosslink by the cationic and/or radical route, via crosslinking functional groups CFGs comprising at least one ethylenically unsaturated, advantageously acrylate and/or alkenyl ether, and/or epoxide and/or oxetane functional group, these CFGs belonging to at least one polyorganosiloxane C* (POS-C*) forming a polymer base PB* and carrying, per molecule, at least two Si—CFG units, and in the presence of an effective amount of cationic or radical initiating system D*.

According to a noteworthy characteristic of the invention, the composition is prepared by mixing the additive (or slurry) with the silicone base (PB or PB*), said mixing optionally being carried out gradually and with or without predilution in a fluid silicone oil forming the silicone base PB (preferably alkenylated, e.g., vinylated, or Si—H oil) or PB*.

It is difficult to prepare the additive (or slurry), which is a concentrated suspension of particulate fillers in one or more reactive or unreactive silicone oils. An attempt is made to obtain a slurry which is a homogeneous dispersion having a fine distribution of the particles in the silicone matrix, the rheology of which is suited to the handling constraints (processability) and which provides the composition according to the invention with the desired attachment/mechanical cohesion/reactivity properties.

It thus appeared desirable, in accordance with the invention, to prepare, in a first step, the additive (or slurry) and then to incorporate it, in a second step, in the composition according to the invention.

This slurry can be predispersed in a fluid silicone oil (for example vinylated oil), that is to say an oil having a viscosity, for example, of less than 1000 mPa·s at 25° C., or can be introduced directly during the forming of the bath (thus immediately before coating).

According to one alternative form, the particulate filler, which is preferably of nanometric size, might be introduced separately from the silicone oil with which it is intended to form the additive (or slurry) within the liquid silicone bath composition for coating.

The Additive (or Slurry)

Preferably, the silicone oil (II) and the optional silicone oil (III) of the additive (or slurry) comprises at least one POS-E capable of reacting with the crosslinking agent R and/or at least one POS-E* capable of reacting with at least one POS-C*.

Preferably, the additive (or slurry) comprises:
100 parts by weight of silicone oil (II) and optionally (III);
from 0 to 5 parts by weight of water;
from 20 to 80 (preferably from 25 to 40 and more preferably still of the order of 30+/−2) parts by weight of particulate filler composed of silica and/or semi-reinforcing siliceous fillers, such as diatomaceous earths or ground quartz; nonsiliceous fillers which can be used, alone or as a mixture, such as carbon black, titanium dioxide, magnesium oxide, aluminum oxide, aluminum hydrate, magnesium silicate, aluminum silicate, natural clay of bentonite or montmorillonite type, expanded vermiculite, unexpanded vermiculite, calcium carbonate, zinc oxide, mica, talc, iron oxide, barium sulfate, slaked lime, diatomaceous earths, ground quartz and ground zirconia; expandable organic microspheres having a polymer wall (homopolymer or copolymer, for example prepared from vinyl chloride, vinylidene chloride, acrylonitrile, methyl methacrylate or styrene monomers or blends or polymers and/or copolymers, for example in particular acrylonitrile/methacrylonitrile copolymers or acrylonitrile/vinylidene chloride copolymer), this wall including a liquid or a gas (alkane, such as isobutane or isopentane); or ground synthetic or natural fibers (polymers);

from 1 to 20 parts by weight of compatibilizing agent selected from:
  silazanes, preferably from disilazanes;
  difunctional or, preferably, monofunctional hydroxylated (cyclo)siloxanes;
  amines, preferably ammonia and/or alkylamines, diethylamine being particularly preferred;
  organic acids, formic acid and/or acetic acid being preferred;
  chlorosilanes;
  organosilicon compounds, such as organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505 and United Kingdom patent GB-A-1 024 234);
  and their mixtures;
  hexamethyldisilazane (HMDZ) and/or octamethylcyclotetrasiloxane, in or not in combination with divinyltetramethyldisilazane (VNM), being particularly preferred.

The particulate filler, preferably of nanometric size, is advantageously treated chemically with compatibilizing agents, such as those targeted above (for example silanes), and/or thermally.

The fillers and in particular the silicon fillers can, for example, be fumed silicas treated with hexamethyldisilazane or with octamethylcyclotetrasiloxane (specific surface 300 m²/g).

These fillers may or may not be inorganic, e.g. ground synthetic or natural fibers (polymers), calcium carbonate, talc, clay, titanium dioxide, and the like. Finally, the fillers can be composed of colloidal silica, formed by hydrolysis/condensation of alkali metal or alkyl (preferably methyl or ethyl) silicates, finely dispersed in the silicone oil.

According to the invention, silica is favored as particulate filler, preferably a nanometric size, and in particular pyrogenic (or fumed) silica with a BET specific surface of between 50 and 400 m²/g and a mean diameter of between 5 and 500 nm, preferably between 5 and 50 nm and more preferably still between 10 and 20 nm.

The BET specific surface is determined according to the Brunauer, Emmett and Teller method described in "The Journal of the American Chemical Society, Vol. 80, page 309 (1938)", corresponding to the standard NFT 45007 of November 1987.

According to an advantageous alternative form, the silica selected can be a colloidal silica, prepared by hydrolysis/condensation of alkali metal or alkyl (preferably methyl or ethyl) silicates, very finely dispersed in a silicone oil, preferably a functional silicone oil, and more preferably still bearing ≡Si-EU' units, with EU' corresponding to the same definition as that given for EU.

The term "very finely dispersed in a silicone oil" is understood to mean, for example, a dispersion comparable to that of the commercial product with the "Nanocones®" trade mark from Hanse Chemie, in terms of fineness or of homogeneity of dispersion.

As regards the preparation of the additive (or slurry), the oil/filler mixture is produced using known and appropriate devices. They can, for example, be: arm mixers, internal mixers, planetary mixers, ploughshare mixers, co- or counterrotating twin-shaft mixers, continuous mixer-extruders or other batchwise or continuous devices. For further details, reference will be made, for example, to the applications WO-A-98/58997, WO-A-02/44259 and WO-A-02/18506.

A preferred embodiment among others can be obtained with LSR slurries, composed of a pyrogenic silica predispersed in viscous vinylated silicone oils and treated in situ with HMDZ and/or VMN. LSRs are silicone elastomer compositions which can cure on heating, "Liquid Silicone Rubber", via polyaddition (hydrosilylation) reactions involving polyorganosiloxanes (in this instance POS-E) carrying ≡Si-EU units, that is to say ethylenic and/or acetylenic unsaturation(s), and POSs comprising ≡Si—H units (in this instance POS-E compounds and/or POS-B compounds), in the presence of a catalytic combination comprising at least one metal catalyst (preferably based on platinum) and optionally at least one inhibitor. These LSR compositions can be of the single- or two-component type.

As regards the water of the dispersion, it is used for the compatibilization reaction between the compatibilizing agent and the particulate filler (for example silazane or alkoxysilane with silica). It is preferable for the residual water to be as limited as possible and more preferably still to be nonexistent on completion of the preparation of the additive.

Silicones of the Polymer Base PB, of the Oil of the Additive (or Slurry) and of the Crosslinking Agent R

POS-A & -E

In a noteworthy way, the POS-A compound or compounds of the PB base and the POS-E compound or compounds of the silicone oil (II), indeed even (III), of the additive (or slurry) is/are chosen from the group of the POS compounds comprising:
  siloxyl units of formula:

$$R^1_n SiO_{4-n/2} \tag{1}$$

siloxyl units of formula:

$$Z_x R^1_y SiO_{4-x-y/2} \tag{2}$$

in which formulae the various symbols have the following meanings:
the $R^1$ symbols, which are identical or different, each represent a group of nonhydrolyzable hydrocarbon nature, it being possible for this radical to be:
  an alkyl radical which has from 1 to 5 carbon atoms and which can comprise from 1 to 6 chlorine atoms;
  cycloalkyl radicals which have from 3 to 8 carbon atoms and which can comprise from 1 to 4 chlorine atoms;
  aryl or alkylaryl radicals which have from 6 to 8 carbon atoms and which can comprise from 1 to 4 chlorine atoms;
  cyanoalkyl radicals which have from 3 to 4 carbon atoms;
  these radicals being optionally substituted, in particular by halogens and/or alkoxyls;
  methyl, ethyl, propyl, isopropyl, butyl, isobutyl, n-pentyl, t-butyl, chloromethyl, dichloromethyl, α-chloroethyl, α,β-dichloroethyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, or xylyl, such as 2,3-dimethylphenyl or 3,4-dimethylphenyl, groups being preferred; methyl and phenyl radicals being particularly preferred;

the Z symbols represent a $C_2$-$C_6$ alkenyl (preferably vinyl) EU group;

n=an integer equal to 0, 1, 2 or 3;

x=an integer equal to 0, 1, 2 or 3;

y=an integer equal to 0, 1 or 2;

the sum x+y lies within the range from 1 to 3;

at least 60%, indeed even at least 85%, of the $R^2$ groups preferably representing methyl groups;

the particularly preferred POS compounds being random (co)polymers of $M^{Vi}(D)_p M^{Vi}$, $M^{Vi}(D)_p(D^{Vi})_q M^{Vi}$, $M(D)_{p'}(D^{Vi})_{q''} M$ or $M(D^{Vi})_{q'''} M$ type, with p, p', p''', q, q', q'' and q''' corresponding to whole numbers, with p, p' and p'' being between 10 and 1000 and q, q', q'' and q''' being between 1 and 50, these (co)polymers being optionally branched.

When they are branched, these particularly preferred POS (co)polymers are advantageously slightly branched, that is to say that they comprise, on average, for example, one or more T and/or Q units.

Mention may be made, as examples of siloxyl units of formula (2) constituting the POS, of: vinyldimethylsiloxyl, vinylphenylmethylsiloxyl, vinylmethylsiloxyl and vinylsiloxyl.

The dimethylsiloxyl, methylphenylsiloxyl, diphenylsiloxyl, methylsiloxyl and phenylsiloxyl units are examples of siloxyl units of formula (1) of the POS.

POS examples are linear and cyclic compounds, such as:
 dimethylpolysiloxanes comprising dimethylvinylsilyl ends,
 (methylvinyl)(dimethyl)polysiloxanes copolymers comprising trimethylsilyl ends,
 (methylvinyl)(dimethyl)polysiloxane copolymers comprising dimethylvinylsilyl ends,
 or cyclic methylvinylpolysiloxanes.

The POS-A or -E can exhibit a linear, branched or cyclic structure. Its degree of polymerization is preferably between 10 and 10 000.

In accordance with the invention, it is perfectly possible to envisage employing a mixture of different POS-A or -E compounds comprising units of formulae (1) and (2) as defined above (linear and/or cyclic).

Advantageously, the silicone base comprises at least one polyorganosiloxane POS; the POS compound or compounds of the silicone base (PB) are chosen from polyorganosiloxanes POSs having a viscosity η, in mPa·S at 25° C., such that:
 50≤η≤100 000
 preferably 100≤η≤100 000
 and more preferably still 150≤η≤2000.

In particular, the POS-A compound or compounds of the silicone base PB are preferably chosen from POSs having a viscosity ηA, in mPa·s at 25° C., such that:
 50≤ηA<100 000
 preferably 100≤ηA<100 000
 and more preferably still 150≤ηA<2000.

It is advantageous for the POS-E compound or compounds of the silicone oil of the additive (or slurry) to be chosen from the oils having a viscosity ηE, in mPa·s at 25° C., such that, in increasing order of preference:
 200≤ηE≤2 000 000
 1000≤ηE≤500 000
 10 000≤ηE≤200 000
 10 000≤ηE≤30 000
 15 000≤ηE≤30 000 it being understood that, in accordance with the invention, the viscosity ηII of the oil (II) and the viscosity ηIII of the optional oil (III) are as defined above.

The number of ≡Si-EU units (EU preferably being an alkenyl and more preferably still a vinyl) per POS-A or -E molecule is preferably greater than or equal to 2. This can represent in particular from 0.01 to 10% (preferably from 0.1 to 2%) of EU by weight per POS-A or -E molecule.

POS-B

Preferably, the POS-B compound or compounds of the crosslinking agent R is/are chosen from the group of the POS compounds comprising:
 siloxyl units of formula:

$$R^2{}_n SiO_{4-n/2} \quad (3)$$

and siloxyl units of formula:

$$HR^2{}_w SiO_{4-w/2} \quad (4)$$

in which formulae the various symbols have the following meanings:
 the $R^2$ symbols, which are identical or different, correspond to the same definition given above for $R^1$;
 n=an integer equal to 0, 1, 2 or 3;
 w=an integer equal to 0, 1, 2 or 3;
at least 60%, indeed even at least 85%, of the $R^2$ groups preferably representing methyl groups;
the POS compounds of $M(D^H)_u M$, $M(D)_v(D^H)_u M$, $M^H(D)_w(D^H)_u M^H$ or $M^H(D)_x(D^H)_{u'''} M$ type, with u, v, w, x, u', u'', u''', v and v' corresponding to integers between 10 and 60 for u, u' and u''' and 10 and 300 for v, w and x, being particularly preferred.

Reference may be made, as other examples of crosslinking agents, to those disclosed in particular in applications FR-A-2 832 413 and FR-A-2 833 963.

More generally, the POS-B is advantageously chosen from linear, cyclic or network homopolymers and copolymers exhibiting, on average, per molecule, preferably at least 3 hydrogen atoms bonded to different silicon atoms, the organic radicals of which bonded to the silicon atoms are chosen from methyl or ethyl radicals, 60 mol % at least of these radicals (and preferably all of these radicals) being methyl radicals.

Examples of siloxyl units forming the POS-B are $H(CH_3)_2 SiO_{1/2}$, $H(CH_3) SiO_{2/2}$ and $H(C_6H_5) SiO_{2/2}$.

Mention may be made, as examples of POS-B, of:
 dimethylpolysiloxanes comprising hydrodimethylsilyl ends,
 copolymers comprising (dimethyl)(hydromethyl)polysiloxane units comprising trimethylsilyl ends,
 copolymers comprising (dimethyl)(hydromethyl)polysiloxane units comprising hydrodimethylsilyl ends,
 methylhydromethyloctylsiloxane copolymers,
 (hydromethyl)polysiloxanes comprising trimethylsilyl ends,
 cyclic (hydromethyl)polysiloxanes,
 $M^H(D)_u M$: dimethylpolysiloxanes comprising hydrodimethylsilyl ends,
 $M(D)_v(D^H)_u M$: copolymers comprising dimethylhydromethylpolysiloxane units comprising trimethylsilyl ends,
 $M^H(D)_w(D^H)_u M^H$: copolymers comprising dimethylhydromethylpolysiloxane units comprising hydrodimethylsilyl ends,
 $M(D^H)_u M$: hydromethylpolysiloxanes comprising trimethylsilyl ends,
 $D^H{}_4$: cyclic hydromethylpolysiloxanes.

According to an alternative form, the silicone oil of the additive (or slurry) might comprise, in addition to the POS-E compounds, which are preferably reactive with the crosslinking agent R, POS-E¹ compounds corresponding to the same definition as the POS-B compounds of the crosslinking agent R.

The number of ≡SiH units per POS-B molecule is preferably greater than or equal to 2. This can in particular represent from 0.001 to 5% (preferably from 0.05 to 2%) of hydrogen by weight for the POS-B compounds.

Preferably, the POS-B compound or compounds of the base PB are chosen from the oils having a viscosity ηB, in mPa·s at 25° C., such that:

50≤ηB<100 000
preferably 100≤ηB<10 000
and more preferably still 150≤ηB<2000

According to a noteworthy characteristic of the invention, the viscosity ηB of the POS-B compound or compounds corresponds to the viscosity ηR of the crosslinking agent R.

Advantageously, the POS-B compound or compounds of the crosslinking agent R are chosen from the POS compounds of M(D)$_v$(D$^H$)$_{u'}$M type, with 20≤u'≤80
preferably 40≤u'≤60
20≤v≤50
preferably 30≤v≤40

According to an advantageous characteristic of the invention, the POS-B compound or compounds of the crosslinking agent R are preferably chosen from the POS compounds in which the number of moles of Si—H per 100 g of oil B is between 0.30 and 1 and preferably between 0.30 and 0.95.

Preferably, in the case where the silicone base is a silicone base comprising at least one silicone oil comprising Si-alkenyl (preferably Si-vinyl (Vi)) units and at least one crosslinking agent R comprising ≡Si—H units capable of reacting together by polyaddition, the ≡Si—H/≡Si-alkenyl (Vi) molar ratio, with regard to the silicone base (PB) additivated with the additive, including the crosslinking agent R, is such that:

1.0≤≡Si—H/≡Si-alkenyl(Vi)≤5 preferably 1.4≤≡Si—H/≡Si-alkenyl(Vi)≤4.

The bases PBs, the POS-E compounds and the crosslinking agents R of the silicone compositions which can crosslink by polyaddition according to the invention can comprise only linear POSs, such as, for example, those described in the patents: U.S. Pat. No. 3,220,972, U.S. Pat. No. 3,697,473 and U.S. Pat. No. 4,340,709.

However, it is also perfectly possible to envisage employing a mixture of different POS-A or -E compounds comprising units of formulae (1) and (2) or POS-B or -E¹ compounds comprising units of formulae (3) and (4) as defined above (linear and/or cyclic).

Polyaddition Metal Catalyst D

The catalysts D are also well known. Use is preferably made of platinum and rhodium compounds. Use may in particular be made of the complexes of platinum and of an organic product described in the patents U.S. Pat. No. 3,159,601, U.S. Pat. No. 3,159,602 and U.S. Pat. No. 3,220,972 and the European patents EP-A-0 057 459, EP-A-0 188 978 and EP-A-0 190 530, or the complexes of platinum and of vinylated organosiloxanes described in the patents U.S. Pat. No. 3,419,593, U.S. Pat. No. 3,715,334, U.S. Pat. No. 3,377,432 and U.S. Pat. No. 3,814,730. The catalyst is generally preferred as platinum. In this case, the amount by weight of catalyst D, calculated as weight of platinum metal, is generally between 2 and 400 ppm, preferably between 5 and 200 ppm, based on the total weight of the polyorganosiloxanes POS-A, -E and -B.

The use according to the invention of crosslinking agents R comprising carefully selected ≡Si—H POS-B compounds makes it possible to produce, with low levels of platinum and thus economically, release coatings on flexible supports. By virtue of the invention, correct crosslinking of the coating is assured at levels of platinum of less than 80 ppm, preferably of the order of 60 ppm and ideally of 40 ppm, for example, this being the case under industrial coating conditions, e.g. at a thermal activation temperature of 150° C.

Silicones of the Polymer Base PB* and of the Oil of the Additive (or Slurry)

POS-C* and -E*

In a noteworthy way, the POS-C* compound or compounds of the base PB and the POS-E* compound or compounds of the silicone oil of the additive (or slurry) is/are chosen from the group of the POS compounds consisting of epoxysilicones and/or vinyl ether silicones, which are:

either linear or substantially linear and composed of units of formula (1) terminated by units of formulae (3.1) and (3.2), or cyclic and composed of units of formula (3.1), with (3.1) and (3.2) corresponding to the following formulae:

in which:

the R³ symbols are identical or different and correspond to the same definition given above for R¹;

at least 60%, indeed even at least 85%, of the R³ groups preferably representing methyl groups;

the Y symbols are identical or different and represent:

either the R³ radical, or a CFG group corresponding to an epoxide or vinyl ether residue connected to the silicon via a divalent radical advantageously comprising from 2 to 20 carbon atoms and optionally comprising a heteroatom, at least one of the Y symbols corresponding to a CFG group.

Mention may be made, as examples of CFG organofunctional groups of the epoxy type, of those of following formulae:

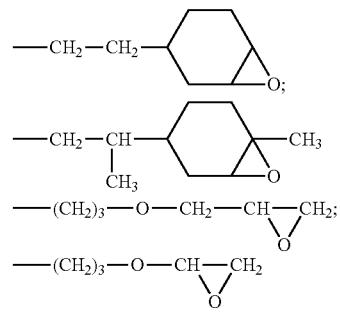

As regards the CFG organofunctional groups of the vinyl ether type, mention may be made, e.g., of those present in the following formulae:

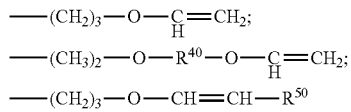

with $R^{40}$ being:
- a linear or branched $C_1$-$C_{12}$ alkylene which is optionally substituted,
- or an arylene, preferably a phenylene, which is optionally substituted, preferably by one to three $C_1$-$C_6$ alkyl groups;

and with $R^{50}$=linear or branched $C_1$-$C_6$ alkyl.

The preferred epoxyfunctional or vinyloxyfunctional polyorganosiloxanes POS-C* and -E* are described in particular in the patents DE-A-4 009 889, EP-A-0 396 130, EP-A-0 355 381, EP-A-0 105 341, FR-A-2 110 115 and FR-A-2 526 800.

The epoxyfunctional polyorganosiloxanes can be prepared by a hydrosilylation reaction between oils comprising Si—H units and epoxyfunctional compounds, such as 4-vinylcyclohexene oxide, allyl glycidyl ether, and the like.

The vinyloxyfunctional polyorganosiloxanes can be prepared by a hydrosilylation reaction between oils comprising Si—H units and vinyloxyfunctional compounds, such as allyl vinyl ether, allylvinyloxyethoxybenzene, and the like.

More preferably still, the POS-C* and -E* compounds are epoxysilicones of following formulae (5) and (6):

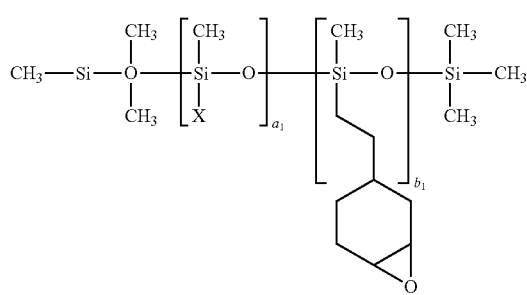

(5)

with X=$CH_3$, phenyl, cycloalkyl, $C_1$-$C_8$-alkyl, alkenyl, —OH, H, $CH_2$—$CH_2$—$CH_2$—OH, $CH_2$—$CH_2$—$CF_3$ or —$(CH_2)_n$—$CF_3$, n=1 to 20;

$a_1$, $a_2$ and $b_1$, $b_2$ being defined as follows in these formulae (5) and (6):

$1 \leq a_1, a_2$  $1 \leq b_1, b_2$ preferably $1 \leq a_1, a_2 \leq 5000$  $1 \leq b_1, b_2 \leq 500$ and more preferably still $1 \leq a_1, a_2 \leq 1000$  $1 \leq b_1, b_2 \leq 100$ $a_2$, $b_2$ being =O in the formula (6) to give a epoxidized disiloxane (7).

It is advantageous for the POS-E* compound or compounds of the silicone oil of the additive (or slurry) to be chosen from the oils having a viscosity $\eta E^*$, in mPa·s at 25° C., such that, in increasing order of preference:

$200 \leq \eta E^* \leq 2\,000\,000$ $1000 \leq \eta E^* \leq 500\,000$ $10\,000 \leq \eta E^* \leq 200\,000$ $10\,000 \leq \eta E^* \leq 30\,000$ $15\,000 \leq \eta E^* \leq 30\,000$ it being understood that, in accordance with the invention, the viscosity $\eta II$ of the oil (II) and the viscosity $\eta III$ of the optional oil (III) are as defined above.

Initiating System D* for Crosslinking by the Cationic or Radical Route

Preferably, the cationic initiating system comprises, as heat initiator and/or photoinitiator, a product chosen from the onium salts of an element from Groups 15 to 17 of the Periodic Table [Chem. & Eng. News, Vol. 63, No. 5, 26, of 4 Feb. 1985] or of an organometallic complex of an element from Groups 4 to 10 of the Periodic Table [same reference] belonging to a specific family of photoinitiators of the type of those described in French patent application No. 96 16237. Such photoinitiators make possible rapid and complete photocrosslinking of the varnish.

According to a preferred characteristic of the invention, the initiators C are, e.g., the onium borates described in European patent application No. 0 562 922, the entire content of which is included by reference in the present patent application. More specifically still, use may be made in practice of the initiator of following formula:

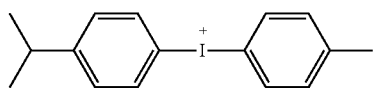

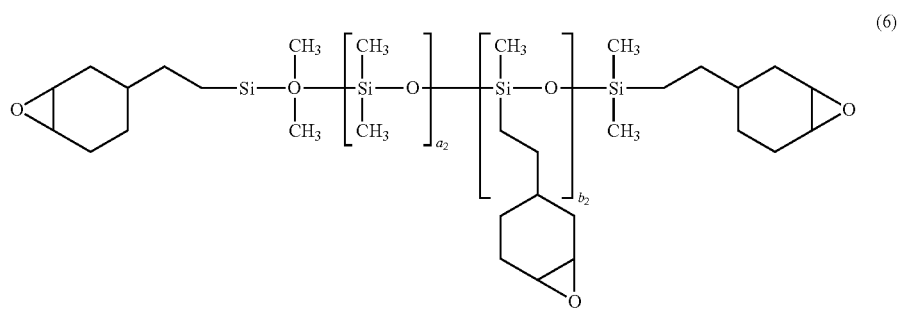

(6)

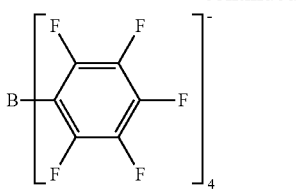

In practice, the initiators of the use according to the invention are prepared in a very simple way by dissolution of the onium borate or organometallic complex borate, preferably onium borate, which are provided in the solid (powder) form in a solvent.

According to an alternative relating to the onium borate, the latter can be prepared directly in the solvent from a salt (e.g., chloride) of the cation (iodonium) and from a salt (for example, potassium) of the borate anion.

Preferably, it is planned, in accordance with the use according to the invention, for the initiator D* to be employed in solution in an organic solvent, preferably chosen from proton-donating solvents and more preferably still from the following group: isopropyl alcohol, benzyl alcohol, diacetone alcohol, butyl lactate, esters and their mixtures. As is claimed in the French patent No. 2 724 660, proton-donating organic solvents with an aromatic nature (benzyl alcohol) behave as crosslinking accelerators. It is therefore advantageous to use them to dissolve the photoinitiator.

It should be specified that the term "effective catalytic amount of D*" is understood to mean within the meaning of the invention, the amount sufficient to initiate the crosslinking.

Insofar as, in practice, as indicated above, the photoinitiator is advantageously dissolved in a polar solvent, in an amount such that the content of photoinitiator in the solution obtained is between 1 and 50% by weight, preferably between 10 and 30% by weight and more preferably still between 15 and 25% by weight.

According to an advantageous form of the use according to the invention, the incorporation of D* in solution in the composition comprising the POS-C* and -E* compounds comprising a given molar content of CFG is carried out in a proportion of 0.1 to 10% by weight of solution, with respect to the final mixture of the composition, preferably of 0.5 to 5% by weight and more preferably of the order of 1% by weight.

According to an alternative form of the invention, use may be made, in addition to the initiating system D*, of crosslinking inhibitors preferably chosen from alkaline products and more preferably still from alkaline products of amino type, for example of the type of those consisting of a silicone to which is grafted at least one amine group, preferably a tertiary amine group.

As regards the other optional additives which may be combined with D*, mention may be made of reactive diluents, such as compounds of epoxide, vinyl ether and oxetane formula:

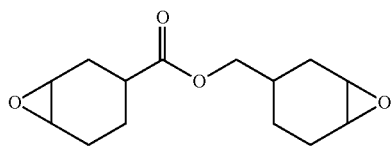

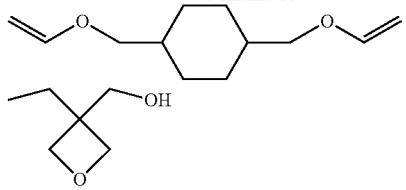

Optional inorganic or organic pigments can also be added to D*. Mention may be made, as examples of pigments, of carbon black, titanium dioxide, phthalocyanine, benzimidazolone, naphthols (BONA pigment lakes), diazopyrazolones, or diarylide or monoarylide yellow pigments.

Optional photosensitizers can be envisaged in order to supplement the system. They can be selected from (poly) aromatic products, which are optionally metallic, and heterocyclic products and preferably from the list of the following products: phenothiazine, tetracene, perylene, anthracene, 9,10-diphenylanthracene, thioxanthone, benzophenone, acetophenone, xanthone, fluorenone, anthraquinone, 9,10-dimethylanthracene, 2-ethyl-9,10-dimethyloxyanthracene, 2,6-dimethylnaphthalene, 2,5-diphenyl-1,3,4-oxadiazole, xanthopinacol, 1,2-benzanthracene, 9-nitroanthracene and their mixtures.

More specifically, the photosensitizer can be a thioxanthone-based product:

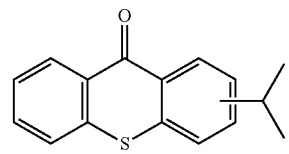

In view of its ease of preparation, of its low cost and of its antifriction properties, the silicone varnish according to the invention is capable of having outlets in numerous fields of application and in particular in the field of the coating of woven or nonwoven fibrous supports.

Viscosities of the Polymer Base, of the Additive (or Slurry) and of the Crosslinking Agent R The viscosity is an important parameter of the composition according to the invention. Thus, according to other advantageous characteristics of the invention:
the polymer base has a viscosity ηPB, in mPa·s at 25° C., such that:
$50 \leq \eta PB < 100\,000$
preferably $100 \leq \eta PB < 5000$
and more preferably still $100 \leq \eta PB < 1000$
and/or the additive (or slurry) has a viscosity nADD, in mPa·s at 25° C., such that:
$1000 \leq \eta ADD < 1\,000\,000$
preferably $20\,000 \leq \eta ADD < 500\,000$
and more preferably still $20\,000 \leq \eta ADD < 100\,000$.

Other Ingredients

Preferably, the composition according to the invention additionally comprises at least one of the following ingredients:
F. at least one attaching ingredient preferably chosen from epoxidized or acrylic silanes and/or silicones;
G. at least one adhesion-adjusting system comprising at least one silicone resin preferably chosen from the MQ, MQOH, MDViQ, MMVi or MMViQ resins or their mixtures;
H. at least one antimisting ingredient;

I. at least one hydroxylated or nonhydroxylated silicone gum;
J. at least one vinylated or nonvinylated silicone gum;
K. at least one agent which inhibits hydrosilylation, preferably chosen from acetylenic alcohols and/or diallyl maleates and their derivatives;
L. at least one other ingredient chosen from bactericides, and/or antigelling or wetting agents, antifoaming agents, or fillers and/or synthetic latexes, and/or dyes, and/or acidifying agents.

Attaching Ingredient F:

Mention may be made, as examples of such additives, of organic or silicone compounds, such as, for example, silicones comprising epoxide or acrylic functional groups.

By way of indication, the amounts capable of being employed are between 0.5 and 5% by weight of the composition according to the invention, which is advantageously a formulated bath.

Adhesion-Adjusting System G

The adhesion-adjusting system G can advantageously be selected from known systems. They can be those described in the French patent FR-B-2 450 642, the patent U.S. Pat. No. 3,772,247 or the European patent application EP-A-0 601 938.

Mention may be made, by way of examples, of the adjusting systems based:
on from 96 to 85 parts by weight of at least one reactive polyorganosiloxane resin of type: $MD^{Vi}Q$, $MM^{Vi}Q$, $MD^{Vi}T$, $MM^{hexenyl}Q$ or $MM^{allyloxypropyl}Q$,
on from 4 to 15 parts by weight of at least one nonreactive resin of type: MD'Q, MDD'Q, MDT', MQ or MDQ.

By way of indication, the amounts of G capable of being employed are between 1 and 70% by weight of the composition according to the invention, which is advantageously a formulated bath.

Antimisting Ingredient H

Mention may be made, as examples of such ingredients, of organic or silicone compounds which can be branched structures or formulations with fillers of silica or other types.

By way of indication, the amounts of H capable of being employed are between 1 and 20% by weight of the composition according to the invention, which is advantageously a formulated bath.

Hydroxylated or Nonhydroxylated Silicone Gum I

Mention may be made, as examples of such gums, of organic or silicone gums comprising hydroxylated functional groups. These functional groups can occur in the chain, at the end of chains or both.

By way of indication, the amounts of I capable of being employed are between 5 and 70% by weight of the composition according to the invention, which is advantageously a formulated bath.

Vinylated or Nonvinylated Silicone Gum J

Mention may be made, as examples of such gums, of vinylated silicone gums which can comprise vinyls in the chain or at the end of chains or both.

By way of indication, the amounts of J capable of being employed are preferably between 5 and 70% by weight of the formulated bath.

Agent which Inhibits Hydrosilylation K

The crosslinking inhibitor K (retardant of the addition reaction and stabilizer of the lifetime of the catalyzed bath) can, for its part, be chosen from the following compounds:
polyorganosiloxanes, advantageously cyclic polyorganosiloxanes, which are substituted by at least one alkenyl, tetramethylvinyltetrasiloxane being particularly preferred,
pyridine,
organic phosphines and phosphites,
unsaturated amides,
alkyl or also allyl maleates,
and acetylenic alcohols.

These acetylenic alcohols (cf. FR-B-1 528 464 and FR-A-2 372 874), which are among the preferred thermal blockers for the hydrosilylation reaction, have the formula:

$$R^{100}-(R^{200})C(OH)-C\equiv CH$$

in which formula:
$R^{100}$ is a linear or branched alkyl radical or a phenyl radical;
$R^{200}$ is H or a linear or branched alkyl radical or a phenyl radical;
it being possible for the $R^{100}$ and $R^{200}$ radicals and the carbon atom situated in the α position with respect to the triple bond to optionally form a ring;
the total number of carbon atoms present in $R^{100}$ and $R^{200}$ being at least 5, preferably from 9 to 20.

Said alcohols are preferably chosen from those exhibiting a boiling point of greater than 250° C. Mention may be made, by way of examples, of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

These α-acetylenic alcohols are commercial products.

Other Ingredients L

Mention may be made, as examples of such additives, of accelerators of the hydrosilylation reaction, which can, for example, be organic or inorganic acids or bases.

By way of indication, the amounts of L capable of being employed are between 0.001 and 5% by weight of the composition according to the invention, which is advantageously a formulated bath.

Physicochemical Forms of the Composition

The liquid coating composition according to the invention can be with or without solvent (preferably without solvent) or as an aqueous emulsion.

In the case where the composition is provided in the form of an aqueous emulsion/dispersion, it then comprises at least one surfactant and optionally at least one agent for fixing the pH.

The agent for fixing and maintaining the pH is preferably a buffer system comprising $HCO_3^-/CO_3^{2-}$ and/or $H_2PO_4^-/HPO_4^{2-}$. Thus, in order to obtain the desired buffer effect, it will be advisable to introduce, in accordance with the invention, an $HCO_3^-$ and/or $H_2PO_4^-$ salt, such as, for example, $NaHCO_3$ and/or $Na_2CO_3$ and/or $NaH PO_4$ and/or $Na HPO_4$. It is obvious that any other salt with a different countercation (e.g., K) might be suitable. Particularly preferably, use is made in practice of a buffer system composed of $NaHCO_3$, which is incorporated in the emulsion.

The surfactant or surfactants capable of being present in the emulsion according to the invention as emulsifying agent are nonionic or ionic in nature.

According to an advantageous arrangement, the proportion of water in the emulsion is greater than or equal to 50% by weight, preferably greater than or equal to 55% by weight and, for example, in practice of the order of 55-60% by weight or alternatively of 85% to 90% by weight.

Crosslinking of the Coating Composition

Polyaddition

According to the invention, for the crosslinking of the coating, the support coated with the polyaddition silicone composition is placed at a temperature of greater than or equal to 110° C., preferably of between 110 and 250° C. and more preferably still of between 130 and 170° C. for less than 60 seconds, preferably less than 10 seconds.

Cationic and/or Radical Route

The coating composition comprising PB* and E* can easily and industrially crosslink by the cationic and/or radical route, by exposure to a beam of electrons and/or to actinic radiation of the UV type and/or by thermal activation.

Other Aspects of the Invention

Composition and Use Thereof

One aspect of the invention is targeted at a composition as defined above for jointly increasing the attachment on departing from the coating device, the mechanical strength and the reactivity of a release and water-repellent silicone coating coated onto a fibrous or nonfibrous flexible support capable of being obtained by crosslinking this composition.

Process for the Preparation of a Coating Bath

Another aspect of the invention is targeted at a process for the preparation of a coating bath based on the composition as defined above, this bath being intended for a high-speed coating device, characterized in that it consists essentially in mixing the components as defined above.

Support

Another aspect of the invention is targeted at a support coated with a coating obtained from the composition as defined above, characterized in that it is chosen from flexible supports made of paper, board or the like, woven or nonwoven flexible fibrous supports, flexible supports comprising polyethylene and/or polypropylene and/or polyester (e.g., Poly (Ethylene Terephthalate) PET) and/or poly(vinyl chloride), and/or thermally printable flexible supports.

Mention may be made, as examples of supports, of paper of various types (supercalendered, coated, glassine), boards, cellulose sheets, metal sheets or plastic films (polyester, polyethylene or polypropylene films, and the like).

The Use of a Silicone Additive (Slurry/Dispersion) in the Liquid Coating Composition (Bath)

Another aspect of the invention is targeted at the use of a silicone additive (slurry/dispersion) comprising from 5 to 80% by weight, in particular from 10 to 50% by weight and more preferably still from 10 to 45% by weight of particulate filler, preferably of nanometric size, in a silicone oil, preferably a reactive silicone oil, in order to jointly increase the attachment on departing from the coating device, the mechanical strength and the reactivity of a release and water-repellent silicone coating coated onto a fibrous or nonfibrous flexible support capable of being obtained by crosslinking a liquid silicone composition for high-speed coating.

This use makes it possible to change the liquid coating composition (bath) in order to improve the rub-off without harming the reactivity. This liquid silicone composition for high-speed coating is advantageously that according to the invention as defined above.

Preparation of the Liquid Coating Composition (Bath)

According to another of its aspects, the present invention relates to a process for the preparation of the liquid silicone composition which can be used in particular as coating base for the production of release and water-repellent coatings, this composition being of the type of that defined above and in the claims below. According to this process, the compounds as defined above are mixed.

Preferably:

a. at least the POS-A oils comprising ≡Si-EU (e.g., Vi) units (preferably linear) and/or the POS-E* oil or oils comprising ≡Si—CFG units forming the polymer base PB are mixed with the additive (or slurry) with mechanical stirring, preferably under high shear;

b. in the polyaddition route, the crosslinking agent R composed of at least one POS-B oil comprising ≡Si—H units of $M(D)_v(D^H)_u M$ type and/or of a mixture of oils comprising POS molecules (preferably linear) each carrying a portion of the $M(D)_v(D^H)_u M$ units present in the crosslinking agent R is subsequently introduced into this PB/slurry mixture;

c. the catalyst D or the initiator D* is also incorporated in the silicone phase, with the optional other ingredients F to L.

The mixing means and methodologies are known to a person skilled in the art, whether concerning compositions with/without solvent or an emulsion.

Process for Production of Crosslinked Release and/or Water-Repellent Silicone Coatings on Flexible Supports The invention is also targeted at a process for the production of crosslinked release and/or water-repellent silicone coatings on flexible supports which consists essentially in employing the liquid silicone coating composition according to the invention as defined above in an industrial high-speed coating device.

The appliances used on industrial devices for the coating of paper comprise a five-roll coating head and air knife or equalizer bar systems, making possible the deposition of the liquid composition over flexible supports or materials. Curing by crosslinking is carried out, e.g. by moving through tunnel ovens heated to 70-200° C. and/or equipped with systems for producing beams of electrons and/or actinic radiation of the UV type; the passage time in these ovens depends on the temperature and/or on the intensity of the beam or of the radiation. For simple thermal activation for the polyaddition route, the passage time in these ovens is generally of the order of 5 to 15 seconds at a temperature of the order of 100° C. and of the order of 1.5 to 3 seconds at a temperature of the order of 180° C.

The amounts of compositions deposited are of the order of 0.5 to 2 g per m² of surface to be treated, which corresponds to the deposition of layers of the order of 0.5 to 2 μm.

The materials or supports thus coated can subsequently be brought into contact with any pressure-sensitive adhesive material of rubber, acrylic or other nature. The adhesive material is then easily detachable from said support or material.

Process for Jointly Increasing the Attachment on Departing from the Coating Device, the Mechanical Strength and the Reactivity of a Crosslinked Release and Water-Repellent Silicone Coating This process, defined above, applies in particular to the composition and to the support according to the invention.

The following examples are given by way of indication and, without limiting it, will make possible a better understanding of the invention.

EXAMPLES

—1—Description of the Silicone Structures and Catalyst Employed

POS-A, sold by Bluestar Silicones=silicone oil vinylated at the chain end $M^{Vi}(D)_pM^{Vi}$: polydimethylsiloxane oil vinylated with 0.033 mol of Vi/100 g and with a viscosity at 25° C.=180 mPa·s at 25° C. This oil comprises 0.15% of ethynylcyclohexanol inhibitor.

Crosslinking agent POS-B, sold by Bluestar Silicones, $M(D)_v(D^H)_{u'}M$=silicone oil hydrogenated in the chain: poly(hydromethyl)siloxane oil POS-B (v=35 and u'=50; viscosity: 70 mPa·s).

Catalyst D: Karstedt Pt comprising 2000 ppm of Pt, sold by Bluestar Silicones.

Control viscous silicone oils vinylated in the chain: oils T1 and T2=polydimethylsiloxane vinylated with 0.033 mol of Vi/100 g and with a viscosity at 25° C.=20 000 (T1) and 4000 (T2) mPa·s at 25° C., sold by Bluestar Silicones.

LSR additive prepared as described in the patent applications EP-A-0 305 032 and EP-A-0 462 032 and more particularly as indicated below:

The process for accessing the additive of LSR base type is a multistage process employing several ingredients, namely:

vinylated polydimethylsiloxane (II)=POS-E comprising $Vi(Me)_2SiO_{1/2}$ chain ends and with a viscosity of 20 000 mPa·s at 25° C. Vi represents vinyl and Me represents methyl, purified water, hexamethyldisilazane, optionally vinyldimethylsilazane, precipitated or fumed silica with a specific surface of between 50 and 400 g/m².

The various operations of the process are described in the following way:

Purging and inerting the mixer with nitrogen for approximately 15 minutes.

Introduction of the purified water into the mixer for a concentration of between 1 and 10% by weight over approximately 20 minutes.

First introduction of vinylated oil (II).

This first charge of vinylated oil represents a fraction of between 40 and 80% of the total charge of the vinylated oil (II), which itself represents a concentration in the additive of approximately 60 to 70%.

Introduction of the hexamethyldisilazane and/or vinyldimethylsilazane charge or charges over approximately 20 minutes. This silazane charge represents a concentration in the additive of approximately 5 to 10% by weight.

The reaction mixture is kept stirred for approximately 20 minutes.

The silica is subsequently introduced into the mixer with stirring over approximately 60 to 120 minutes. The concentration of silica in the additive is between 25 and 30% by weight.

The reaction mixture is kept stirred for approximately 60 to 180 minutes.

A phase of heating the mixture is subsequently begun, which mixture is brought to a temperature of between 140 and 160° C. over a period of time of approximately 60 to 180 minutes.

Second introduction of vinylated oil (II).

This second charge of vinylated oil represents a fraction of between 5 and 15% of the total charge of the vinylated oil (II).

The reaction mixture is kept stirred and heated for approximately 60 to 180 minutes.

Third introduction of vinylated oil (II). This third charge of vinylated oil represents a fraction of between 10 and 30% of the total charge of the vinylated oil (II).

The reaction mixture is subsequently cooled with stirring to a temperature of approximately 50° C.

Additives, such as silicone resins or gums, can be introduced in some cases at this temperature at concentrations of between 0.1 and 5% by weight.

The additive can subsequently be packaged.

Nanocone VN 10 000 additive, sold by Hanse Chemie.

—2—Formulation of the Baths

Control without filler (control test).

Control without filler but with viscous oils T1 and T2 (tests 2 and 3).

Tests with LSR additive (slurry) (formulation A and D and F and G).

TABLE 1

|  | Formulations | | | | | |
|---|---|---|---|---|---|---|
|  | Control | F1 | F2 | F3 | F4 | F5 |
| POS-A | 100 | 100 | 100 | 100 | 100 | 100 |
| POS-B | 8.2 | 8.2 | 8.2 | 8.2 | | |
| Catalyst D | 2.9 | 2.9 | 2.9 | 2.9 | 2.9 | 2.9 |
| Vinylated oil T2 V 4000 | | | 1.4 | | | |
| Vinylated oil T1 V 20 000 | | | 1.8 | 3.3 | | |
| LSR base additive | | 5 | | | 5 | 15 |

TABLE 2

| Formulations | Control | F6 | F7 |
|---|---|---|---|
| POS-A | 100 | 100 | 100 |
| POS-B | 8.2 | 8.2 | 8.2 |
| Catalyst D | 2.9 | 2.9 | 2.9 |
| LSR additive | | 5 | |
| Nanocone VN 10 000 additive | | | 5 |

—3—Order of Mixing and Conditions for the Preparation of the Baths

Stage 1: Mixing of the vinylated base polymer and of the additive by introduction of the nanofiller into the vinylated polymer with mechanical stirring, with or without strong shearing (UltraTurrax type), in order to optimally disperse the nanofiller.

Stage 2: Introduction of the crosslinking agent B into the mixture, still with mechanical stirring.

Stage 3: Introduction of the catalyst into the mixture, still with mechanical stirring.

—4—Coating and Crosslinking Conditions Nature/Reference of the Support Used

All the coatings were carried out on the Rotomec pilot coating plant under the following general conditions of temperature and of winding-off speed:

Type of support coated: glassine paper, ref. H65, from Raflatac, grammage 62.

Support winding-off machine speed: 100 m/min.
Temperature of the ovens: 155° C.
Support temperature: 135° C.
Dwell time: 3.6 s.

The deposition of silicone over the support can vary over a range extending from 0.1 to 5 g/m².

—5—Results/Properties

Once having left the coating device, the silicone-treated paper is subjected to monitoring of the adhesion and of the resistance to abrasion of the coating according to the rub-off test described below, and also to measurement of the thickness of silicone deposited on the paper and the content of extractables (uncrosslinked silicone fraction), which makes it possible to characterize the reactivity of the system.

An aging test is also carried out, which test consists in placing the silicone-treated paper in a climate-controlled oven at 50° C./70% relative humidity (RH).

The level of extractables is measured (at the outlet of the coating device: in-line/4 days after the crosslinking: off-line): the test consists in immersing the coating in Methyl IsoButyl Ketone (MIBK) and in then quantitatively determining by atomic absorption spectrophotometry, Perkin-Elmer 3100 (the silicone having transferred into the solvent).

The level of silicone extractable from the coating is accessed with calibration.

The rub-off measurement for confirming the adhesion to the support and the resistance to abrasion of the silicone layer consists in rubbing the index finger over the silicone-treated support in order to impose mechanical stresses on the layer. The number of to-and-fro movements with the finger until the phenomenon of rub-off (or scrubbing) appears, corresponding to a tearing of the silicone coating to shreds, is recorded.

The grade of 10 confirms the excellent stability of the silicone layer.

The grade of 10+ will describe very "hard" coatings on which the rubbing of the finger will be difficult.

The following are summarized in tables 3 and 4 below for the various tests carried out:

the deposition of silicone, that is to say the amount of silicone deposited per surface area of paper;

the fraction of silicone extractable with MIBK, that is to say the level of uncrosslinked silicone, the amount of silicon in the extraction solvent being determined by atomic absorption;

the resistance to rub-off of the silicone-treated liner, immediately or after an increasing storage time in a humid oven.

The improvement in the strength of the silicone-treated paper, subsequent to the incorporation of the nanofillers, is observed, and without significant loss in the reactivity of the formulation. It is found that the resistance to rub-off is markedly improved with respect to the control baths without filler or additivated with the same amount of vinylated silicone oil as that contributed by the LSR additive.

Attachment and Extractables Evaluation

The performances in the rub-off test and also the level of extractables at the oven outlet of the formulations evaluated have been combined in the following tables 3 and 4. It should be remembered here that the aim is to find a low level of extractables (sign of extensive polymerization) and good resistance in the rub-off test.

TABLE 3

| Formulation | SiH/SiVi Ratio | Pt | Deposition g/m² | % Extractables | Rub-off Device outlet | Rub-off 3 days at 25° C. | Rub-off 3 days at 50° C. and 70% RH |
|---|---|---|---|---|---|---|---|
| Control | 2.5 | 50 | 1.05 | 3.5 | 1 | 6 | 4 |
| F1 | 2.5 | 50 | 1.3 | 4.2 | 10 | 10 | 10 |
| F2 | 2.5 | 50 | 1.26 | 2.7 | 1 | 10 | 10 |
| F3 | 2.5 | 50 | 1.3 | 2.9 | 1 | 10 | 10 |
| F4 | 2.5 | 50 | 1.3 | 2.8 | 1 | 6 | 8 |
| F5 | 2.5 | 50 | 1.3 | 2.6 | 8 | 10 | 10 |

TABLE 4

| Formulation | SiH/SiVi Ratio | Pt ppm | Deposition g/m² | % Extractables | Rub-off Device outlet | Rub-off 2 days at 25° C. | Rub-off 2 days at 50° C. and 70% RH | Rub-off 8 days at 25° C. | Rub-off 8 days at 50° C. and 70% RH | Rub-off 25 days at 25° C. | Rub-off 25 days at 50° C. and 70% RH |
|---|---|---|---|---|---|---|---|---|---|---|---|
| Control | 2.5 | 50 | 1.16 | 2.5 | 1 | 10 | 10 | 10 | 10 | 10 | 7 |
| F6 | 2.5 | 50 | 1.21 | 2 | 10+ | 10 | 10 | 10 | 10 | 10 | 10 |
| F7 | 2.5 | 50 | 1.16 | 1.6 | 7 | 10 | 10 | 10 | 10 | 10 | 10 |

EXAMPLES

—1—Description of the Silicone Structures and Catalyst Employed

POS-A=silicone oil vinylated at the chain end, $M^{Vi}(D)_p$ $M^{Vi}$: polydimethylsiloxane oil vinylated with 0.033 mol of Vi/100 g and with a viscosity at 25° C.=180 mPa·s at 25° C. This oil comprises 0.15% of ethynyl cyclohexanol inhibitor, POS-B1=crosslinking agent of formula $M(D)_v(D^H)_{u'}$ M=silicone oil hydrogenated in the chain: poly(hydromethyl)siloxane oil (v=35 and u'=50; viscosity: 70 mPa·s), POS-B2=crosslinking agent of formula $M(D)_v(D^H)_{u'}$ M=silicone oil hydrogenated in the chain: poly(hydromethyl)siloxane oil (v=35 and u'=50; viscosity≤100 mPa·s), D: Karstedt Pt catalyst comprising 2000 ppm of Pt, T1 and T2=viscous silicone oils, polydimethylsiloxane vinylated with 0.033 mol of Vi/100 g and with a viscosity of 25° C.=20 000 (T1) and 4000 (T2) mPa·s at 25° C., LSR 30 base additive (slurry of silica treated with a compatibilizing agent+silicone oil), sold by Bluestar Silicones France SAS, prepared as indicated below:

The process for accessing the additives of LSR base type is a multistage process employing several ingredients, namely:
  vinylated polydimethylsiloxane (II)=POS-E comprising $Vi(Me)_2SiO_{1/2}$ chain ends and with a viscosity of 20 000 mPa·s at 25° C. Vi represents vinyl and Me represents methyl,
  purified water,
  hexamethyldisilazane,
  optionally vinyldimethylsilazane,
  precipitated or fumed silica with a specific surface of between 50 and 400 g/m².

The various operations of the process are described in the following way:
  Purging and inerting the mixer with nitrogen for approximately 15 minutes.
  Introduction of the purified water into the mixer for a concentration of between 1 and 10% by weight over approximately 20 minutes.
  First introduction of vinylated oil (II).
  This first charge of vinylated oil represents a fraction of between 40 and 80% of the total charge of the vinylated oil (II), which itself represents a concentration in the additive of approximately 60 to 70%.
  Introduction of the hexamethyldisilazane and/or vinyldimethylsilazane charge or charges over approximately 20 minutes. This silazane charge represents a concentration in the additive of approximately 5 to 10% by weight.
  The reaction mixture is kept stirred for approximately 20 minutes.
  The silica is subsequently introduced into the mixer with stirring over approximately 60 to 120 minutes. The concentration of silica in the additive is between 25 and 30% by weight.
  The reaction mixture is kept stirred for approximately 60 to 180 minutes.
  A phase of heating the mixture is subsequently begun, which mixture is brought to a temperature of between 140 and 160° C. over a period of time of approximately 60 to 180 minutes.
  Second introduction of vinylated oil (II).
  This second charge of vinylated oil represents a fraction of between 5 and 15% of the total charge of the vinylated oil (II).
  The reaction mixture is kept stirred and heated for approximately 60 to 180 minutes.
  Third introduction of vinylated oil (II). This third charge of vinylated oil represents a fraction of between 10 and 30% of the total charge of the vinylated oil (II).
  The reaction mixture is subsequently cooled with stirring to a temperature of approximately 50° C.
  Additives, such as silicone resins or gums, can be introduced in some cases at this temperature at concentrations of between 0.1 and 5% by weight.
  The additive can subsequently be packaged.

Nanocone VN 10 000 additive, sold by Hanse Chemie.

—2—Formulation of the Baths

Control: without filler or viscous vinylated silicone oil.
Comparative examples CE1 and CE2: without filler but with viscous oils T1 and T2.
Examples 1 and 2: Tests with LSR 30 additive (slurry).

TABLE 1'

| Formulations | Control | CE1 | CE2 | Ex. 1 | Ex. 2 |
|---|---|---|---|---|---|
| POS-A | 100 | 100 | 100 | 100 | 100 |
| POS-B1 | 8.2 | 8.2 | 8.2 | 8.2 | |
| POS-B2 | | | | | 10.1 |
| Catalyst D | 2.9 | 2.9 | 2.9 | 2.9 | 2.9 |
| Vinylated oil T2 V 4000 | | 1.4 | | | |
| Vinylated oil T1 V 20 000 | | 1.8 | 3.3 | | |
| LSR 30 base additive | | | | 5 | 15 |

Ex. 1a = same formulation A-B1-D-LSR 30 as example 1. Comparative example CE 3: without filler but with Nanocone VN 10 000 additive.

TABLE 2'

| Formulations | Ex. 1a | CE 3 |
|---|---|---|
| POS-A | 100 | 100 |
| POS-B1 | 8.2 | 8.2 |
| Catalyst D | 2.9 | 2.9 |
| LSR 30 additive | 5 | |
| Nanocone VN 10 000 additive | | 5 |

—3—Order of Mixing and Conditions for the Preparation of the Baths of Ex. 1, 1a and 2

Stage 1: Mixing of the vinylated base polymer POS-A and of the additive (LSR 30) by introduction of the nanofiller into the vinylated polymer POS-A with mechanical stirring, with or without strong shearing (UltraTurrax type), in order to optimally disperse the nano filler.

Stage 2: Introduction of the crosslinking agent POS-B (B1 or B2) into the mixture, still with mechanical stirring.

Stage 3: Introduction of the catalyst D into the mixture, still with mechanical stirring.

—4—Coating and Crosslinking Conditions Nature/Reference of the Support Used

All the coatings were carried out on the Rotomec pilot coating plant under the following general conditions of temperature and of winding-off speed:

Type of support coated: glassine paper, ref. H65, from Raflatac, grammage 62.

Support winding-off machine speed: 100 m/min.

Temperature of the ovens: 155° C.
Support temperature: 135° C.
Dwell time: 3.6 s.

The deposition of silicone over the support can vary over a range extending from 0.1 to 5 g/m².

—5—Tests

Once having left the coating device, the silicone-treated paper is subjected to monitoring of the adhesion and of the resistance to abrasion of the coating according to the rub-off test described below, and also to measurement of the thickness of silicone deposited on the paper and the content of extractables (uncrosslinked silicone fraction), which makes it possible to characterize the reactivity of the system.

An aging test is also carried out, which test consists in placing the silicone-treated paper in a climate-controlled oven at 50° C./70% relative humidity RH.

The level of extractables is measured (at the outlet of the coating device: in-line/4 days after the crosslinking: off-line): the test consists in immersing the coating in Methyl IsoButyl Ketone (MIBK) and in then quantitatively determining by atomic absorption spectrophotometry, Perkin-Elmer 3100 (the silicone having transferred into the solvent).

The level of silicone extractable from the coating is accessed with calibration.

The rub-off measurement for confirming the adhesion to the support and the resistance to abrasion of the silicone layer consists in rubbing the index finger over the silicone-treated support in order to impose mechanical stresses on the layer. The number of to-and-fro movements with the finger until the phenomenon of rub-off (or scrubbing) appears, corresponding to a tearing of the silicone coating to shreds, is recorded. The grade of 10 confirms the excellent stability of the silicone layer.

The grade of 10+ will describe very "hard" coatings on which the rubbing of the finger will be difficult.

—6—Results

The results obtained for the various tests carried out are summarized in tables 3' and 4' below:

the deposition of silicone, that is to say the amount of silicone deposited per surface area of paper;

the fraction of silicone extractable with MIBK, that is to say the level of uncrosslinked silicone, the amount of silicon in the extraction solvent being determined by atomic absorption;

the resistance to rub-off of the silicone-treated liner, immediately or after an increasing storage time in a humid oven.

It should be remembered here that the aim is to obtain a low level of extractables (sign of extensive polymerization) and a value in the rub-off test which is close to 10 (sign of good mechanical strength).

TABLE 3'

| Test | SiH/SiVi ratio | Pt (ppm) | Deposition (g/m²) | % Extractables | Rub-off Device outlet | Rub-off 3 days at 25° C. | Rub-off 3 days at 50° C. and 70% RH |
|---|---|---|---|---|---|---|---|
| Control | 2.5 | 50 | 1.05 | 3.5 | 1 | 6 | 4 |
| CE 1 | 2.5 | 50 | 1.26 | 2.7 | 1 | 10 | 10 |
| CE 2 | 2.5 | 50 | 1.3 | 2.9 | 1 | 10 | 10 |
| Ex. 1 | 2.5 | 50 | 1.3 | 4.2 | 10 | 10 | 10 |
| Ex. 2 | 2.5 | 50 | 1.3 | 2.6 | 8 | 10 | 10 |

Table 3' above shows that a low level of extractables is achieved for the compositions of the invention and the reactivity of the compositions is thus satisfactory for the desired application. Furthermore, the results of the rub-off test are markedly improved with respect to the comparative compositions and to the control, which demonstrates the excellent adhesion, mechanical strength and cohesion of the coatings obtained by the present invention.

The improvement in the strength of the silicone-treated paper, subsequent to the incorporation of the nanofillers, is thus observed, and without significant loss in the reactivity of the formulation. It is found that the resistance to rub-off is markedly improved with respect to the control baths without filler or additivated with the same amount of vinylated silicone oil as that contributed by the LSR 30 additive.

TABLE 4'

| Test | SiH/SiVi ratio | Pt (ppm) | Deposition (g/m²) | % Extractables | Rub-off Device outlet | Rub-off 2 d at 25° C. | Rub-off 2 d at 50° C. and 70% RH | Rub-off 8 d at 25° C. | Rub-off 8 d at 50° C. and 70% RH | Rub-off 25 d at 25° C. | Rub-off 25 d at 50° C. and 70% RH |
|---|---|---|---|---|---|---|---|---|---|---|---|
| Ex. 1a | 2.5 | 50 | 1.21 | 2 | 10+ | 10 | 10 | 10 | 10 | 10 | 10 |
| CE 3 | 2.5 | 50 | 1.16 | 1.6 | 7 | 10 | 10 | 10 | 10 | 10 | 10 |

Table 4' above shows an improvement in terms of adhesion, of mechanical strength and of cohesion on departing from the device in the coatings obtained by the present invention, Ex. 1a, compared with the comparative example, CE 3, the additive of which is based on Nanocone VN 10 000.

What is claimed is:

1. A liquid silicone composition for high-speed coating onto fibrous or nonfibrous flexible supports and which is capable of crosslinking to form a release and water-repellent coating, comprising a silicone base capable of curing by radical, cationic or polyaddition reactions, said silicone composition comprising:
at least one polyorganosiloxane carrying on Si-EU units constituting the polymer base, with EU representing a group comprising at least one ethylenic unsaturation, and at least one polyorganosiloxane carrying on Si—H units, the Si—H units being capable of reacting with the Si-EU units by polyaddition; or at least one polyorganosiloxane constituting the polymer base which can crosslink by the cationic or radical route, via crosslinking functional groups CFGs comprising at least one functional group selected from ethylenically unsaturated functional groups, epoxide functional groups, and oxetane functional groups; and
a catalyst appropriate for the curing reaction selected from the group consisting of a metal catalyst as regards the crosslinking by polyaddition, an initiator comprising a thermal initiator and photoinitiator or both as regards the crosslinking by the cationic or radical route, and mixtures thereof; and said liquid silicone composition comprising, per 100 parts by weight of silicone base, from 1 to 40 parts by weight of an additive consisting essentially of:
I. of from 1 to 80% by weight of particulate siliceous filler treated with at least one compatibilizing agent,
II. of from 95 to 20% by weight of at least one silicone oil having a viscosity $\eta II$, in mPa·s at 25° C., such that $8000 \leq \eta II \leq 2\,000\,000$
III. and optionally of at least one silicone oil with a viscosity $\eta III$ of less than or equal to 8000 mPa·s at 25° C.; the particulate siliceous filler being dispersed in the silicone oil II, optionally made up with the silicone oil III;
this composition having an overall viscosity of less than or equal to 5000 mPa·s at 25° C.

2. The composition as claimed in claim 1, which is prepared by mixing the additive with the silicone base, said mixing being carried out gradually and with or without predilution in a fluid silicone oil forming the silicone base.

3. The composition as claimed in claim 1, wherein the particulate siliceous filler treated is obtained from silica or semi-reinforcing siliceous fillers to which is added a compatibilizing agent selected from:
silazanes;
difunctional or monofunctional hydroxylated (cyclo)siloxanes;
amines;
organic acids;
chlorosilanes;
organosilicon compounds;
and their mixtures.

4. The composition as claimed in claim 3, wherein the silica is a pyrogenic silica with a BET specific surface of between 50 and 400 m$^2$/g and a mean diameter of between 5 and 500 nm.

5. The composition as claimed in claim 3, wherein the silica is a colloidal silica, prepared by hydrolysis/condensation of alkali metal or alkyl silicates, dispersed in a silicone oil.

6. The composition as claimed in claim 1, wherein the silicone base comprises at least one polyorganosiloxane POS, said POS compound or compounds being chosen from polyorganosiloxanes POSs having a viscosity $\eta$, in mPa·s at 25° C., such that $50 \leq \eta \leq 100\,000$.

7. The composition as claimed in claim 1, wherein the silicone base is a silicone base comprising at least one silicone oil comprising ≡Si-alkenyl units and at least one crosslinking agent R comprising ≡Si—H units capable of reacting together by polyaddition and in that, with regard to the silicone base, including the crosslinking agent R, additivated with the additive, the ≡Si—H/≡Si-alkenyl molar ratio is such that $1.0 \leq \equiv Si—H/\equiv Si\text{-alkenyl} \leq 5$.

8. The composition as claimed in claim 1, for jointly increasing the attachment on departing from the coating device, the mechanical strength and the reactivity of a release and water-repellent silicone coating coated onto a fibrous or nonfibrous flexible support capable of being obtained by crosslinking this composition.

9. A process for the preparation of a coating bath based on the composition as claimed in claim 1, this bath being intended for a high-speed coating device, said process consisting essentially in mixing the components as defined in claim 1.

10. A support coated with a coating obtained from the composition as claimed in claim 1, said support being chosen from:
flexible supports selected from the group consisting of paper, board and combinations thereof,
flexible woven or nonwoven fibrous supports,
flexible supports comprising polyethylene, polypropylene, polyester, poly(vinyl chloride), or mixtures thereof,
thermally printable flexible supports.

11. A process for the production of crosslinked release or water-repellent silicone coatings on flexible supports, said process consisting essentially in employing the liquid silicone coating composition as claimed in claim 1 in a high-speed industrial coating device.

12. A process for jointly increasing the attachment on departing from the coating device, the mechanical strength and the reactivity of a release and water-repellent silicone coating coated onto a fibrous or nonfibrous flexible support, in which a liquid silicone composition for high-speed coating is crosslinked,
said liquid silicone composition comprising a silicone base capable of curing by radical, cationic or polyaddition reactions,
said silicone composition comprising:
at least one polyorganosiloxane carrying on Si-EU units constituting the polymer base, with EU representing a group comprising at least one ethylenic unsaturation, and at least one polyorganosiloxane carrying on Si—H units, the Si—H units being capable of reacting with the Si-EU units by polyaddition; or at least one polyorganosiloxane constituting the polymer base which can crosslink by the cationic or radical route, via crosslinking functional groups CFGs comprising at least one functional group selected from ethylenically unsaturated functional groups, or epoxide functional groups, and oxetane functional groups; and a catalyst appropriate for the curing reaction selected from the group consisting of a metal catalyst as regards the crosslinking by polyaddition, an initiator comprising a thermal initiator or photoinitiator or both as regards the crosslinking by the cationic or radical route, and mixtures thereof; and said liquid silicone composition comprising, per 100 parts by weight of base, from 1 to 40 parts by weight of an additive consisting essentially of:

I. of from 1 to 80% by weight of particulate siliceous filler treated with at least one compatibilizing agent, II. of from 95 to 20% by weight of at least one silicone oil having a viscosity ηII, in mPa·s at 25° C., such that 8000≤ηII≤2 000 000

III. and optionally of at least one silicone oil with a viscosity of less than or equal to 8000 mPa·s at 25° C.;

the particulate siliceous filler being dispersed in the silicone oil (II), optionally made up with the silicone oil (III);

and said composition having an overall viscosity of less than or equal to 5000 mPa·s at 25° C.

13. The process as claimed in claim 12, wherein the composition is prepared by mixing the additive with the silicone base, said mixing being carried out gradually and with or without predilution in a fluid silicone oil forming the silicone base, and wherein the support is coated with a coating obtained from the composition for high-speed coating onto fibrous or nonfibrous flexible supports and which is capable of crosslinking to form a release and water-repellent coating, comprising a silicone base capable of curing by radical, cationic or polyaddition reactions, said composition comprising:

at least one polyorganosiloxane carrying on Si-EU units constituting the polymer base, with EU representing a group comprising at least one ethylenic unsaturation, and at least one polyorganosiloxane carrying on Si—H units, the Si—H units being capable of reacting with the Si-EU units by polyaddition; or at least one polyorganosiloxane constituting the polymer base which can crosslink by the cationic or radical route, via crosslinking functional groups CFGs comprising at least one functional group selected from ethylenically unsaturated functional groups, epoxide functional groups, and oxetane functional groups; and a catalyst appropriate for the curing reaction selected from the group consisting of a metal catalyst as regards the crosslinking by polyaddition, an initiator comprising a thermal initiator or photoinitiator or both as regards the crosslinking by the cationic or radical route, and mixtures thereof; and said composition comprising, per 100 parts by weight of silicone base, from 1 to 40 parts by weight of an additive consisting essentially of:

I. of from 1 to 80% by weight of particulate siliceous filler treated with at least one compatibilizing agent, II. of from 95 to 20% by weight of at least one silicone oil having a viscosity ηII, in mPa·s at 25° C., such that 8000≤ηII≤2 000 000

III. and optionally of at least one silicone oil with a viscosity ηIII of less than or equal to 8000 mPa·s at 25° C.; the particulate siliceous filler being dispersed in the silicone oil II, optionally made up with the silicone oil III;

this composition having an overall viscosity of less than or equal to 5000 mPa·s at 25° C., said support being chosen from flexible supports selected from the group consisting of paper, board, flexible woven or nonwoven fibrous supports, polyethylene, proplypropylene, polyester, poly (vinyl chloride), thermally printable flexible supports and combinations thereof.

* * * * *